(12) United States Patent
Pinckney

(10) Patent No.: US 6,248,678 B1
(45) Date of Patent: *Jun. 19, 2001

(54) LOW EXPANSION GLASS-CERAMICS

(75) Inventor: Linda R. Pinckney, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/413,126

(22) Filed: Oct. 6, 1999

Related U.S. Application Data

(60) Provisional application No. 60/105,852, filed on Oct. 27, 1998.

(51) Int. Cl.[7] .................................................. C03C 10/02
(52) U.S. Cl. .............................................. 501/10; 501/69
(58) Field of Search ......................................... 501/10, 69

(56) References Cited

U.S. PATENT DOCUMENTS

| | | |
|---|---|---|
| 3,497,366 | 2/1970 | Simmons . |
| 3,681,097 | 8/1972 | Beall et al. . |
| 3,681,102 | 8/1972 | Beall . |
| 4,687,750 | 8/1987 | Pinckney . |
| 5,028,567 | 7/1991 | Gotoh et al. . |
| 5,330,939 | 7/1994 | Marazzi et al. . |
| 5,476,821 | 12/1995 | Beall et al. . |
| 5,491,116 | 2/1996 | Beall et al. . |
| 5,561,089 | 10/1996 | Ishizaki et al. . |
| 5,658,835 | 8/1997 | Onitani et al. . |
| 5,968,857 | 10/1999 | Pinckney . |

FOREIGN PATENT DOCUMENTS

| | | |
|---|---|---|
| 710 627 A1 | 5/1996 | (EP) . |
| 1221851 | 2/1971 | (GB) . |
| 1544779 | 4/1979 | (GB) . |
| 1-208343 | 8/1989 | (JP) . |
| WO98/22405 | 5/1998 | (WO) . |

OTHER PUBLICATIONS

Dumas et al., "Role of Zirconium in Nucleation and Crystallization of a ($SiO_2$, $Al_2O_3$, MgO, ZnO) Glass", *Journal of Materials Science Letters*, 1985, pp. 129–132.

Tkalčec et al., "Crystallization of High–Quartz Solid in Gahnite Glass–Ceramics," *Journal of Non–Crystalline Solids*, 1991, pp. 174–182.

Translation of JP 1–208343 (Item 12 above).

*Primary Examiner*—Karl Group
(74) *Attorney, Agent, or Firm*—Maurice M. Klee

(57) ABSTRACT

Transparent glass-ceramics comprising the following composition, expressed in terms of weight percent on an oxide basis: 60–75 $SiO_2$, 8–20 $Al_2O_3$, 2–10 ZnO, 1–6 MgO, 1–10 $TiO_2$, 0–6 $ZrO_2$, 0–3 BaO, ZnO+MgO in combination being greater than or equal to about 5.5, and $TiO_2+ZrO_2$ in combination being greater than about 4. The glass-ceramics have thermal expansion coefficients of about $22-32 \times 10^{-7}/°$C. and strain points over 850° C.

25 Claims, No Drawings

LOW EXPANSION GLASS-CERAMICS

CROSS REFERENCE TO RELATED PROVISIONAL APPLICATION

This application claims the benefit under 35 USC §119(e) of U.S. Provisional Application Ser. No. 60/105,852, filed Oct. 27, 1998, the content of which in its entirety is hereby incorporated by reference.

FIELD OF THE INVENTION

The present invention relates to transparent low expansion spinel-based glass-ceramic materials.

BACKGROUND OF THE INVENTION

U.S. patent application Ser. No. 09/030,863, filed on Mar. 31, 1997 and entitled "Glass-Ceramics," the disclosure of which is incorporated herein by reference in its entirety, disclosed materials that can be used as substrates for high temperature polysilicon thin films. The transparent glass-ceramic materials disclosed in Ser. No. 09/030,863 have high strain points and coefficients of thermal expansion which are compatible with polycrystalline silicon, especially high temperature poly-Si. The glass-ceramics disclosed in Ser. No. 09/030,863 have expansions that were designed to closely match that of silicon (C.T.E. of $32$–$42\times10^{-7}$/° C.).

It would be desirable to provide glass ceramics having high strain points, and in addition, having thermal expansion characteristics that are intermediate between those of silica and of silicon. Glass-ceramics having a thermal expansion below about $32\times10^{-7}$/° C. over the temperature range of 25–1000° C. and having strain points in excess of 850° C. can be preferable in various applications. It would also be advantageous to provide a glass-ceramic having a low density in combination with the low thermal expansion and high strain point.

SUMMARY OF THE INVENTION

One aspect of the present invention relates to transparent glass-ceramics containing spinel as a predominant crystal phase, optionally accompanied by minor amounts of zirconia, Mg-petalite, β-quartz solid solution or titanate, said glass-ceramic comprising the following composition as calculated in weight percent on an oxide basis: 60–75 $SiO_2$, 8–20 $Al_2O_3$, 2–10 ZnO, 1–6 MgO, 1–10 $TiO_2$, 0–6 $ZrO_2$, 0–3 BaO, ZnO+MgO in combination being greater than or equal to about 5.5, and $TiO_2+ZrO_2$ in combination being greater than about 4.

By transparent, it is meant that 1.1 mm thick sheets of the glass-ceramics of the present invention exhibit greater than 85 percent transmittance over the visible region (400 nm to 700 nm) of the spectrum. Preferably, for certain applications, it is also desirable that these sheets exhibit some transmittance in the near ultraviolet as well, for example, greater than 50 percent over the region 350–400 nm.

The transparent spinel-based glass-ceramics of the present invention exhibit a number of advantages compared to prior art glass-ceramics materials. For example, these glass ceramics exhibit thermal expansion coefficients of about 22 to $32\times10^{-7}$/° C., more preferably $25$–$30\times10^{-7}$/° C. over the temperature range 25° C. to 300° C. and strain points over 850° C., more preferably over 875° C., and most preferably over 900° C. Spinel solid solution comprises the predominant crystal phase in these materials.

These glass-ceramics consequently possess high thermal stability and can withstand temperatures of 900° C. for 24 hours and 1000° C. for 8 hours without distorting, warping, or losing transparency. The predominant (and usually sole) crystal phase in these materials consists of spinel solid solution $(Zn,Mg)Al_2O_4$, although the spinel may be accompanied by minor amounts of other crystal phases, e.g., zirconia, Mg-petalite, β-quartz solid solution, or $MgTi_2O_5$ with no deleterious effects on transparency or properties. By predominant crystal phase, it is meant that this crystal phase is at least about 75 volume percent, more preferably at least 85 percent, and most preferably at least 95 percent of the total crystalline phases present. The glass-ceramics of the present invention are also preferably at least about 20 weight percent crystalline phases dispersed within a glassy matrix.

The glass-ceramics of the present invention exhibit excellent chemical durability. They also exhibit densities less than 2.70 grams/cc.

Glasses described herein can be melted at temperatures of 1575° to 1650° C. and are compatible with conventional forming processes including casting, pressing, and rolling. The compatibility of the precursor glasses with conventional melting and forming techniques, particularly rolling, renders these materials suitable candidates for the manufacture of large sheets. Their higher rigidity and strength compared to that of glass (Young's modulus greater than $12\times10^6$ psi, modulus of rupture$>10\times10^3$ psi) would permit the use of thinner sheets when compared to glass materials.

The lower expansion, refractory glass-ceramics of the present invention can be used in a wide variety of applications ranging from substrates employing high temperature thin films, such as active matrix liquid crystal displays (AMLCD's) to components for optical devices such as optical waveguides. They are particularly useful for substrates in AMLCD applications because the peripheral drive circuitry can be placed directly on the substrate, a cost and space savings. The high strain points of these glasses enable processing at high temperatures in excess of 850° C. In addition, the materials of the present invention can find use in a wide variety of applications including but not limited to a substrate material in various electric, electronic, and optoelectronic devices such as, for example, flat panel displays, solar batteries, photomasks, and optomagnetic disks.

Although these glasses require melting temperatures higher than those higher-expansion, lower-silica glasses, they retain relatively smooth viscosity curves and have similar or higher liquidus viscosities of 1000 to over 5000 poise. The glass-ceramics have strain points well in excess of 850° C. and are preferable in applications that require a lower thermal expansion. These higher silica materials also have lower densities, which is advantageous for many applications.

DETAILED DESCRIPTION OF THE INVENTION

The present invention involves transparent spinel-based glass-ceramics with thermal expansion coefficients of about $22$–$32\times10^{-7}$/° C. and strain points over about 850° C. The predominant and usually sole crystal phase in these materials consists of spinel solid solution $(Zn,Mg)(Al,Ti)_2O_4$.

Glass-ceramics consist of randomly oriented crystals dispersed within a matrix of residual glass and can be produced through controlled internal nucleation and crystallization of a precursor glass body. Hence, a glass forming batch of the desired composition is melted and that melt is cooled and simultaneously formed into a glass shape of a predetermined configuration utilizing conventional glass forming techniques. Glass forming batches for the inventive spinel crystal-containing glass-ceramic precursor glasses described herein are easily melted and the ensuing melts can be shaped into articles of widely varying geometries. The composition of the precursor glass, and the subsequently formed glass-ceramic, comprises or consists essentially of the following ingredients, expressed in weight percent:

| | | | |
|---|---|---|---|
| $SiO_2$ | 60–75 | BaO | 0–3 |
| $Al_2O_3$ | 8–20 | | |
| ZnO | 2–10 | | |
| MgO | 1–6 | | |
| $TiO_2$ | 1–10 | (ZnO + MgO) | $\geq 5.5\%$ |
| $ZrO_2$ | 0–6 | ($TiO_2$ + $ZrO_2$) | $\geq 4\%$ |

Fining agents, such as $As_2O_5$ or $Sb_2O_3$, may be added to the glass compositions described herein, if needed or desired. In addition, up to 5% of other oxides or fluorides, such as $Rb_2O$, $WO_3$, $Nb_2O_5$, $AlF_3$, $B_2O_3$, $CeO_2$, $Y_2O_3$, or $P_2O$ and/or up to 8% of $Cs_2O$, $Bi_2O_3$, $Ta_2O_3$, $Ga_2O_3$, PbO, or $La_2O_3$, can be added if desired. The levels of $K_2O$, $Na_2O$, $Li_2O$, CaO and SrO should preferably be limited to no more than 3%, and most preferably are zero. It is desirable that the glass-ceramics of the present invention be free of mobile alkali ions.

If the amount of $SiO_2$ is less than 60%, the proportion of spinel to residual glass increases, causing the thermal expansion coefficient to increase. $Al_2O_3$ is a necessary component of the spinel, (Zn, Mg) $Al_2O_4$ (1 mole (ZnO, MgO) combines with one mole $Al_2O_3$). Therefore, if $Al_2O_3$ is less than 8 percent, too little spinel may be formed, and the thermal expansion coefficient might be too low. If the amount of $Al_2O_3$ exceeds 20 percent, the liquidus temperature increases, making the glass more difficult to melt.

Both the MgO and ZnO constituents are key spinel crystal formers with $Al_2O_3$. Therefore, either one or the other or both must be present in the glass-ceramic compositions. ZnO strongly favors the crystallization of very fine grained spinel crystals and helps minimize the crystallization of unwanted phases. A minimum of 2% ZnO is desired for optimal properties. ZnO should preferably be less than 10 weight percent to prevent the melting temperature from becoming too high, thereby making glass melting difficult. While all-Mg spinel ($MgAl_2O_4$) glass-ceramics can be made, MgO strongly promotes the growth of non-spinel phases such as Mg-petalite, β-quartz, and $MgTi_2O_5$, which tends to degrade transparency. A maximum of 6 percent MgO is therefore desired.

The sum of (ZnO+MgO) is preferably at least 5.5 weight percent in order to ensure sufficient crystallization of the spinel phase and obtain the desired properties. The sum of ($TiO_2+ZrO_2$) is preferably at least 4% to optimize nucleation and transparency. Titania serves as both an extremely effective nucleating agent in these glasses and as an integral component of the spinel crystals. While titania alone, zirconia alone, or mixtures of the two oxides will nucleate the spinel phase, nucleation with zirconia alone is generally not desired from a practical point of view, as $ZrO_2$ significantly raises the liquidus temperature of the glass and gives very steep viscosity curves and the ever-present danger of stoning. Zirconia also increases the density of the glass-ceramics, which is undesirable for most applications. Moreover, zirconia is less efficient than titania in nucleating spinel in glasses that contain significant levels of magnesia. If not well nucleated, magnesia-containing glasses in this composition range tend to produce β-quartz solid solution and Mg-petalite instead of or in addition to spinel, leading to undesirable crystal growth and subsequent haziness or opacity in the glass-ceramic, as well as cracking in the most severe cases. The more magnesia in a composition, the higher the level of titania required to efficiently nucleate the spinel phase. While 5% $TiO_2$ is sufficient in Mg-free spinel compositions, a minimum of 7.5% $TiO_2$ generally is required in compositions with more than about 2% MgO by weight, providing $ZrO_2$ is absent.

Glass-ceramics typically have strain point temperatures significantly higher than those of their precursor glasses because the crystal phases take up many of the fluxing agents in the glass, leaving the residual glass (which is actually the "glass" whose strain point is measured in the glass-ceramic) with fewer fluxes—therefore "harder"—than the precursor glass. The glass-ceramics described herein are designed to have a residual glass whose composition is high in silica content and also theoretically very similar structurally to silica, thereby providing strain points in excess of 850° C., preferably over 875° C., and most preferably over 900° C.

For the highest possible strain points, the residual glass (i.e., the portion that is not crystalline) in these glass-cermaics should have a composition as close to that of pure silica as possible, or with as few non-bridging oxygens as possible. For this reason, the preferred glass-ceramics are designed to have molar ratios of $(R_2O+RO)/Al_2O_3$ between about 0.5 and 1.5, more preferably about 0.75 to 1.25 and most preferably about 0.85 to 1.15, where $R_2O$=alkali oxides and RO=alkaline earth oxides+ZnO. These ratios can serve as useful indicators of the overall peraluminousness or peralkalinity of the system, which in turn acts as reasonable predictor of properties such as strain point. It is believe that, the higher these ratios, the more non-bridging oxygen atoms there will be in the residual glass and thus the lower the strain point of the glass-ceramic. Generally, the more peraluminous compositions yield the highest strain points, but often with sacrifices in glass stability and liquidius/viscosity relationships.

[1] At page 1, lines 11–14, the present application incorporates by reference the contents of the '863 application.

Preferably, the composition of precursor glass, and ultimately the glass-ceramic, comprises or consists essentially, expressed in terms of weight percent on the oxide basis, of about:

| | | | |
|---|---|---|---|
| $SiO_2$ | 60–75 | BaO | 0–3 |
| $Al_2O_3$ | 8–20 | | |
| ZnO | 2–10 | | |
| MgO | 1–6 | | |
| $TiO_2$ | 1–10 | (ZnO + MgO) | $\geq 5.5\%$ |
| $ZrO_2$ | 0–6 | ($TiO_2$ + $ZrO_2$) | >4% |

Most preferably, the composition of precursor glass, and ultimately the glass-ceramic, comprises or consists essentially, expressed in terms of weight percent on the oxide basis, of about:

| | | | |
|---|---|---|---|
| $SiO_2$ | 65–75 | BaO | 0–2 |
| $Al_2O_3$ | 10–15 | | |
| ZnO | 3–7 | | |
| MgO | 2–5 | | |

-continued

| | | | |
|---|---|---|---|
| $TiO_2$ | 4–8 | (ZnO + MgO) | $\geq 6\%$ |
| $ZrO_2$ | 0–4 | ($TiO_2 + ZrO_2$) | $\geq 4\%$ |

STEM micrographs indicate that the size of the spinel crystals of the preferred transparent glass-ceramics of the present invention range from 75 to 200 Angstroms in diameter (7.5–20 nm). Partly due to the ultra fine crystal size, these materials can be polished in the glass state to a surface roughness (Ra) of less than 10 Angstroms, over a surface area of 2 microns×2 microns, and will retain this degree of surface roughness after ceramming to a glass-ceramic.

The materials of the present invention are compatible with conventional glass melting and forming processes, particularly rolling, and should thereby enable cost effective manufacture of large sheets required for substrates for thin film polysilicon solar cells, or flat panel displays. Moreover, their higher rigidity and strength compared to glass or fused silica should permit the use of thinner sheets in, for example, substrates for active matrix liquid crystal displays and other flat panel displays.

The above-described transparent glass-ceramic can be obtained by the conventional two-stage heat treatment used for development of nuclei and subsequent growth of crystals. It can also be obtained by a one-stage heat treatment. In a one (or two) stage heat treatment, the upper limit of the temperature for growing crystals should preferably be in the range of 875°–1050° C.

The invention is further illustrated by the following examples, which are meant to be illustrative, and not in any way limiting, to the claimed invention. Table I records a number of glass compositions, expressed in terms of part by weight on the oxide basis, illustrating the compositional parameters of the present invention. Inasmuch as the sum of the individual constituents totals or very closely approximates 100, for all practical purposes the reported values may be deemed to represent weight percent. The actual batch ingredients may comprise any materials, either oxides or other compounds, which, when melted together with the other batch components, will be converted into the desired oxide in the proper proportions.

The glass-ceramics described in Table I were prepared using standard laboratory procedures. Glass batches were ball milled and melted in platinum crucibles at 1600–1650° C. for 4 to 16 hours and cast onto steel plates as 5"×6"×0.5" patties. The glass patties were annealed for one hour at 725°–750° C. and subsequently cooled overnight. Coupons were then cut from the glass patties and cerammed using one or more heat treatment schedules, as noted in Table I (H.T.). The glasses of the present invention may be nucleated at 775°–800° C. for 1–2 hours and then crystallized for 2–4 hours at temperatures of 950°–1050° C. Standard powder X-ray diffraction techniques were used to determine the crystal phase(s) present in the glass-ceramic. In all of the examples cited, the sole crystal phase present is spinel solid solution (s.s.).

The composition range of these glass-ceramics comprises (in weight per cent): 60–75 $SiO_2$, 8–20 $Al_2O_3$, 2–10 ZnO, 1–6 MgO, 1–10 $TiO_2$, and 0–6 $ZrO_2$. The addition of modifiers (<3%) such as BaO or $Cs_2O$ helps glass stability. The sum of (ZnO+MgO) should be at least 5.5% in order to ensure the crystallization of the spinel phase, and the sum of ($TiO_2+ZrO_2$) should be at least 4% for optimal nucleation and transparency. $As_2O_5$ is the presently preferred fining agent.

Glass batches were ball milled and melted in platinum crucibles at 1600–1650° C. for 4–16 hours and cast onto steel patties were annealed for one hour at 725–750° C. and subsequently cooled overnight. Coupons were then cut from the glass patties and cerammed using one or more heat treatment schedules, as noted in Table 1. The glasses were typically nucleated at 775–800° C. for 1–2 hours and crystallized for 2–4 hours at temperatures of 950°–1050° C. Standard powder X-ray diffraction techniques were used to determine the crystal phase(s) present in the glass-ceramic. Thermal expansion coefficients were measured from 25° to 300° C. on glass-ceramic samples, using standard procedures.

In order to estimate the upper use temperature of these materials, beam bending viscosity techniques were employed to measure the strain point of the glass-ceramic samples. The strain point of a glass (or, in this case, a glass-ceramic) is the temperature at which internal stresses are reduce significantly in a number of hours, and is defined as the temperature at which the viscosity of the glass is $10^{14.5}$ poise. One common method of designating a maximum use temperature of a material is defining such temperature as 50 degrees below its strain point.

Table 1 lists compositions of representative glass-ceramic compositions in weight per cent. In all of the examples cited, the sole crystal phase present is spinel solid solution (s.s.). Table 1 also lists measurements of several chemical and physical properties determined on the glass-ceramics in accordance with techniques conventional in the glass art. Strain and anneal points, expressed in terms of ° C., was determined by beam bending viscometry. The linear coefficient of thermal expansion (C.T.E) over the temperature range 25°–300° C. was measured using dilatometry. Density is listed in $g/cm^3$.

Also reported in Table 1 are liquidus and high temperature viscosity-related data for the precursor glasses, including liquidus temperature, liquidus viscosity, and the temperatures at which the glasses exhibit a viscosity of $10^3$ poise, $10^4$ poise, $10^5$ poise, and $10^6$ poise. This viscosity information is relevant because, in a preferred embodiment of the invention, the glass-ceramic composition is chosen to result in a glass material which has a relatively large working range, which means that the viscosity curve for the glass is not steep (i.e., the change in viscosity versus temperature is gradual).

Glass-ceramics typically have strain point temperatures significantly higher than those of their precursor glasses because the crystal phases take up many of the fluxing agents in the glass, leaving the residual glass (which is actually the "glass" whose strain point is measured in the glass-ceramic) with fewer fluxes—therefore "harder"—than the precursor glass. The glass-ceramics described in this disclosure are designed to have a residual glass whose composition is very high in silica (>80%), thereby generally providing strain points over 900° C.

The compatibility of the precursor glasses with conventional melting and forming techniques, particularly with rolling, renders these materials suitable candidates for the manufacture of large sheets. Their higher rigidity and strength compared to that of glass (elastic modulus>12×10$^6$ psi, modulus of rupture>11×10$^3$ psi) would also permit the use of thinner sheets of glass-ceramic compared with that of glass.

Preferred compositions have a combination of low density, high strain point, and good glass working properties. Preferred examples from Table 1 include Example 4 (C.T.E.=30×10$^{-7}$/° C.), Example 6 (C.T.E.=28×10$^{-7}$/° C.)

Example 9 (C.T.E.=27×10$^{-7}$/° C.), and Example 11 (C.T.E.= 25×10$^{-7}$/° C.

These refractory glass-ceramics can be used in a wide variety of applications ranging from substrates for active matrix liquid crystal displays and thin film solar cells to components for optical devices.

Although the invention has been described in detail for the purpose of illustration, it is understood that such detail is solely for that purpose and variations can be made therein by those skilled in the art without departing from the spirit and scope of the invention which is defined by the following claims.

TABLE 1

| wt % | 1 | 2 | 3 | 4 | 5 | 6 | 7 |
|---|---|---|---|---|---|---|---|
| SiO$_2$ | 64.8 | 63.4 | 66.3 | 67.0 | 65.8 | 68.7 | 70.7 |
| Al$_2$O$_3$ | 15.8 | 17.3 | 15.5 | 15.7 | 15.4 | 14.1 | 12.9 |
| ZnO | 7.5 | 6.4 | 5.8 | 3.9 | 7.0 | 5.2 | 4.8 |
| MgO | 2.1 | 3.2 | 2.8 | 3.9 | 2.2 | 2.6 | 2.4 |
| BaO | 1.7 | 1.7 | 1.6 | 1.6 | 1.6 | 1.4 | 1.3 |
| TiO$_2$ | 5.0 | 5.0 | 5.0 | 5.0 | 5.0 | 5.0 | 5.0 |
| ZrO$_2$ | 3.0 | 3.0 | 3.0 | 3.0 | 3.0 | 3.0 | 3.0 |
| NH$_4$NO$_3$ | 1.0 | 1.0 | 1.0 | 1.0 | 1.0 | 1.0 | 1.0 |
| As$_2$O$_5$ | 0.5 | 0.5 | 0.5 | 0.5 | 0.5 | 0.5 | 0.5 |
| H.T. | 800/1, 1000/2 | 800/1, 1000/2 | 800/1, 1000/2 | 800/1, 1000/2 | 800/1, 1000/2 | 800/1, 1000/2 | 800/1, 1000/2 |
| CTE(×10$^{-7}$/° C.) | 31.3 | 32.7 | 30.2 | 30.4 | 30.9 | 28.3 | 27.3 |
| Strain pt ° C. | 910 | 903 | 924 | 898 | 907 | 902 | 908 |
| Anneal pt ° C. | 988 | 982 | 1000 | | | | 990 |
| Density (g/cm$^3$) | | | 2.62 | 2.59 | 2.64 | 2.59 | 2.56 |
| Density: glass | | | | 2.55 | 2.59 | 2.54 | 2.52 |
| E-mod. (10$^6$ psi) | | | | 12.8 | 12.9 | 12.6 | |
| Liq. Temp ° C. | 1480 | 1450 | 1485 | 1485 | 1490 | 1490 | 1475 |
| Approx. Visc. At Liq. Temp. | | | | 1800 | 1500 | 2500 | |
| T ° C. @ 10$^3$ p | | | | 1532 | 1518 | 1572 | |
| T ° C. @ 10$^4$ p | | | | 1363 | 1353 | 1395 | |
| T ° C. @ 10$^5$ p | | | | 1242 | 1235 | 1270 | |
| T ° C. @ 10$^6$ p | | | | 1149 | 1146 | 1176 | |

| wt % | 8 | 9 | 10 | 11 | 12 | 13 | 14 |
|---|---|---|---|---|---|---|---|
| SiO$_2$ | 72.4 | 71.3 | 70.2 | 71.6 | 72.4 | 73.2 | 71.6 |
| Al$_2$O$_3$ | 11.9 | 13.0 | 12.8 | 12.7 | 11.9 | 13.0 | 12.7 |
| ZnO | 4.4 | 3.2 | 5.8 | 4.4 | 4.4 | 4.4 | 4.3 |
| MgO | 2.2 | 3.2 | 1.8 | 2.1 | 2.2 | 2.2 | 2.1 |
| BaO | 1.2 | 1.3 | 1.3 | 1.2 | 1.2 | 1.2 | — |
| B$_2$O$_3$ | — | — | — | — | 1.0 | — | — |
| Cs$_2$O | — | — | — | — | — | — | 2.2 |
| TiO$_2$ | 5.0 | 5.0 | 5.0 | 5.0 | 5.0 | 4.0 | 5.0 |
| ZrO$_2$ | 3.0 | 3.0 | 3.0 | 3.0 | 3.0 | 2.0 | 2.0 |
| NH$_4$NO$_3$ | 1.0 | 1.0 | 1.0 | 1.0 | 1.0 | 1.0 | 1.0 |
| As$_2$O$_5$ | 0.5 | 0.5 | 0.5 | 0.5 | 0.5 | 0.5 | 0.5 |
| H.T. | 800/1, 1000/2 | 800/1, 1000/2 | 800/1, 1000/2 | 800/1, 1000/2 | 800/1, 1000/2 | 800/1, 1000/2 | 800/1, 1000/2 |
| CTE(×10$^{-7}$/° C.) | 25.2 | 27.3 | 26.7 | 25.2 | 26.3 | 24.7 | 25.3 |
| Strain pt ° C. | 909 | 908 | 916 | 938 | 878 | 929 | 910 |
| Anneal pt ° C. | 991 | 988 | 997 | 1014 | | 1006 | 993 |
| Density (g/cm$^3$) | 2.54 | 2.54 | 2.57 | 2.54 | 2.53 | 2.52 | 2.54 |
| Density: glass | 2.50 | 2.50 | 2.53 | 2.50 | | 2.47 | 2.49 |
| Liq. Temp ° C. | 1485 | 1480 | 1475 | 1480 | | 1490 | 1440 |
| Approx. Visc. At Liq. Temp. | | | | 6500 | | | 15,500 |
| T ° C. @ 10$^3$ p | | | | | | | |
| T ° C. @ 10$^4$ p | | | | 1449 | | | 1470 |
| T ° C. @ 10$^5$ p | | | | 1316 | | | 1327 |
| T ° C. @ 10$^6$ p | | | | 1222 | | | 1217 |

What is claimed is:

1. A transparent glass-ceramic containing solid solution spinel as a predominant crystal phase and exhibiting a linear coefficient of thermal expansion (CTE) over the temperature range 25–300° C. between 22–32×10$^{-7}$/° C., the glass-ceramic comprising the following composition as calculated in weight percent on an oxide basis: 60–75 SiO$_2$, 8–20 Al$_2$O$_3$, 2–10 ZnO, 1–6 MgO, 1–10 TiO$_2$, 0–6 ZrO$_2$, 0–3 BaO, ZnO+MgO in combination being greater than or equal to about 5.5, TiO$_2$+ZrO$_2$ in combination being greater than or equal to about 4, and the molar ratio of (R$_2$O+RO)Al$_2$O$_3$ being between about 0.5 and 1.5, where R$_2$O is the sum of the moles of alkali oxides and RO is the sum of the moles of alkaline earth oxides plus ZnO.

2. The glass-ceramic of claim 1, wherein said glass-ceramic has a strain point greater than about 850° C.

3. The glass-ceramic of claim 1, wherein said glass-ceramic has a CTE of 25–30×10$^{-7}$/° C.

4. The glass-ceramic of claim 3, wherein said glass-ceramic has a strain point greater than about 875° C.

5. The glass-ceramic of claim 3, wherein said glass-ceramic has a strain point greater than about 900° C.

6. The glass-ceramic of claim 1, wherein ZnO+MgO in combination is less than about 10 weight percent.

7. A glass-ceramic according to claim 1, further comprising at least one component selected from the group consisting of transition metal oxides, $P_2O_5$, $Rb_2O$, CaO, SrO, $B_2O_3$, $CeO_2$, sulfates, and halides, in an amount not exceeding 5 weight percent in total.

8. A glass-ceramic according to claim 1, comprising one or more of $Li_2O$, $Na_2O$, CaO, SrO, and $K_2O$ in an amount less than 3 weight percent.

9. In an optical device, the improvement comprising a substrate having a glass-ceramic composition in accordance with claim 1.

10. In a flat panel display device, the improvement comprising a substrate having a glass-ceramic composition in accordance with claim 1.

11. In a liquid crystal display device, the improvement comprising a substrate having a glass-ceramic composition in accordance with claim 1.

12. A glass-ceramic according to claim 1, wherein said glass-ceramic has a composition comprising, as expressed in weight percent: 65–75 $SiO_2$, 10–15 $Al_2O_3$, 3–7 ZnO, 2–5 MgO, 4–8 $TiO_2$, 0–4 $ZrO_2$, 0–2 BaO, ZnO+MgO in combination being greater than or equal to about 6, and $TiO_2$+$ZrO_2$ in combination being greater than or equal to about 4.

13. The glass-ceramic of claim 12, wherein said glass-ceramic has a strain point greater than about 850° C.

14. The glass-ceramic of claim 12, wherein said glass-ceramic has a CTE of $25–30 \times 10^{-7}$/° C.

15. The glass-ceramic of claim 14, wherein said glass-ceramic has a strain point greater than about 875° C.

16. The glass-ceramic of claim 14, wherein said glass-ceramic has a strain point greater than about 900° C.

17. The glass-ceramic of claim 12, wherein ZnO+MgO in combination is less than about 10 weight percent.

18. A glass-ceramic according to claim 12, further comprising at least one component selected from the group consisting of transition metal oxides, $P_2O_5$, $Rb_2O$, CaO, SrO, $CeO_2$, sulfates, and halides, in an amount not exceeding 5 weight percent in total.

19. A glass-ceramic according to claim 12, further comprising at least one ingredient selected from the group consisting of $Cs_2O$, $Bi_2O_3$, $Ta_2O_3$, $Ga_2O_3$, PbO, or $La_2O_3$ in an amount not exceeding 8 weight percent.

20. A glass-ceramic according to claim 12, comprising one or more of $Li_2O$, $Na_2O$, CaO, SrO, and $K_2O$ in an amount less than 3 weight percent.

21. In an optical device, the improvement comprising a substrate having a glass-ceramic composition in accordance with claim 12.

22. In a flat panel display device, the improvement comprising a substrate having a glass-ceramic composition in accordance with claim 12.

23. In a liquid crystal display device, the improvement comprising a substrate having a glass-ceramic composition in accordance with claim 12.

24. The glass ceramic of claim 1, wherein the molar ratio of $(R_2O+RO)/Al_2O_3$ is between about 0.75 and 1.25.

25. The glass ceramic of claim 1, wherein the molar ratio of $(R_2O+RO)/Al_2O_3$ is between about 0.85 and 1.15.

* * * * *